United States Patent
Ng et al.

(10) Patent No.: US 8,099,533 B2
(45) Date of Patent: Jan. 17, 2012

(54) CONTROLLER AND A METHOD FOR CONTROLLING THE COMMUNICATION BETWEEN A PROCESSOR AND EXTERNAL PERIPHERAL DEVICE

(75) Inventors: Chee Yu Ng, Singapore (SG); Nitin Satishchandra Kabra, Bangalore (IN)

(73) Assignee: NXP B.V., Eindhoven (NL)

( * ) Notice: Subject to any disclaimer, the term of this patent is extended or adjusted under 35 U.S.C. 154(b) by 711 days.

(21) Appl. No.: 11/573,194

(22) PCT Filed: Jul. 22, 2005

(86) PCT No.: PCT/IB2005/052477
§ 371 (c)(1),
(2), (4) Date: Jul. 15, 2009

(87) PCT Pub. No.: WO2006/016298
PCT Pub. Date: Feb. 16, 2006

(65) Prior Publication Data
US 2011/0099304 A1    Apr. 28, 2011

(30) Foreign Application Priority Data
Aug. 3, 2004  (EP) ..................................... 04103727

(51) Int. Cl.
*G06F 3/00*  (2006.01)
*G06F 13/12*  (2006.01)
*G06F 15/00*  (2006.01)
(52) U.S. Cl. .................... 710/52; 710/3; 710/62; 712/1
(58) Field of Classification Search .......... None
See application file for complete search history.

(56) References Cited

U.S. PATENT DOCUMENTS

| 5,894,560 A | 4/1999 | Carmichael et al. |
| 5,907,702 A | 5/1999 | Flynn et al. |
| 7,136,991 B2 | 11/2006 | Henry et al. |
| 2002/0091719 A1 | 7/2002 | Cole |
| 2002/0114338 A1 | 8/2002 | Craig et al. |
| 2003/0023663 A1 | 1/2003 | Thompson et al. |
| 2004/0073635 A1 | 4/2004 | Narad et al. |
| 2004/0215892 A1* | 10/2004 | Fluhr et al. .................... 711/137 |

FOREIGN PATENT DOCUMENTS

| CN | 1195135 A | 10/1998 |
| CN | 1503128 A | 6/2004 |
| WO | 01/38970 A2 | 5/2001 |

OTHER PUBLICATIONS

Advanced Micro Devices product Am29N323D, Data Sheet, Publn. No. 23476N (Aug. 2002).

* cited by examiner

*Primary Examiner* — Alan Chen

(57) ABSTRACT

The present invention relates to a data processing system based on a multithreaded operating system. The data processing system comprises at least one processor (PROC) for processing data based on multiple threads, at least one controller unit (CU) for controlling the communication between said at least one processor (PROC) and an external peripheral device (PD) connected to said at least one controller unit (CU). Said at least one controller unit (CU) comprises at least one buffer memory (BM) for buffering data from said peripheral device (PD) connected to said at least one controller unit (CU), and at least one memory managing unit (MMU) for managing the access to said at least one buffer memory (BM) by mapping said at least one buffer memory (BM) into N banks (C0-C3) each with a dedicated prefetch register (Addr.0-Addr.3). At least one of said multiple threads (T0-T3) is mapped to one of said N banks (C0-C3) and its dedicated prefetch register (Addr.0-Addr.3).

5 Claims, 2 Drawing Sheets

CONTROLLER AND A METHOD FOR CONTROLLING THE COMMUNICATION BETWEEN A PROCESSOR AND EXTERNAL PERIPHERAL DEVICE

The invention relates to a data processing system, a controller, and a method of for controlling the communication between a processor and an external peripheral device.

In order to enhance the performance of modem microprocessor based data processing systems a generic interface, which may be a SRAM-like interface, i.e. a memory mapped interface, is used to expand the system capabilities. Examples of this interface may include Universal Serial Bus USB controller, modem controller, IEEE 1394 controller or the like. These controllers enable the microprocessor in the data processing system to communicate with external devices connected to the controller. For example peripherals devices like portable digital assistants PDA, mobile phones, digital cameras and portable storage devices may use an USB interface to exchange data with a host computer. However, such peripherals may also communicate with each other without a host computer, if each peripheral device comprises a USB interface. All these controllers and interfaces have in common that they typically contain a local memory management unit MMU which is designed to handle the access requests from a microprocessor to an internal buffer memory of the peripheral devices.

Accessing or reading the internal buffer memory via the memory management unit MMU involves a prefetch period. This period constitutes the time period which is required by the memory managing unit MMU to fetch the data from the buffer memory. It should be noted that the prefetch period is typically a few times longer than the usual read period.

A microprocessor may use a reduced timing during the data processing to meet the prefetch constraints. Here, a delay is introduced which corresponds to the prefetch period for each and every access to the buffer memory of the controller. Alternatively, a ready signal may be used. However, such ready signal may not be available for all data processing platforms.

In order to improve the reading from external expanded system capabilities, i.e. peripheral devices, the reading is performed using a burst mode. Here, the microprocessor writes the desired start address, i.e. the address where the reading of data should start, into a register which is used as the prefetch addresses. Thereafter, the microprocessor waits for a prefetch period and initiates the accessing of the external device at full speed, i.e. the normal operation speed. This also applies to accessing sequential data. However, if the microprocessor needs to access data at another location in the external device, the prefetch cycle must be started again. Accordingly, the prefetch constraints are met without requiring a ready signal and without reducing the available bandwidth at the controller for the external device. For more information please refer to Data Sheet of Am29N323D of Advanced Micro Devices, Rev. B, Aug. 8, 2002.

However, problems may occur in a multi-threading, multi-tasking data processing environment. If a first thread is accessing the external device from the address 0x1000 for 512 bytes, and after reading 256 bytes, the data processing system may switch to a second thread which may have a higher priority and the second thread writes a different address into the register for the prefetch address. As soon as the second thread has finished its processing, an access to the external device will end and the data processing system will switch back to the first thread. However, as the current value in the register for the prefetch address has been altered by the second thread, this may lead to data corruption.

US 2002/0091719 relates to a message processing system in a data system environment between computers and computer networks which operate on the basis of multithreaded sets of data. The different threads are handled by a ferris wheel queue. In particular, the ferris wheel queue comprises a handling unit which has information on the availability of buffer space and also on the source of the incoming data. In order to write data, a thread has first of all to request a handling unit for itself. If no buffer space is available, such a request is rejected. Problems may occur if the handling unit is arranged on the side of the memory device, i.e. the external device, as the handling unit will not have any information on which thread is currently accessing the buffer. On the other hand, if the handling unit rejects a request to read/write, the data processing system may break down as an external device should never reject a read/write. The ferris wheel queue is applicable for multiple thread requiring the buffering of some data and sharing the same physical buffer. A special mechanism for request/grant/reject is required in order to ensure that threads do not interfere with other current write/read operations of other threads. However, introducing such a mechanism for grant/request/reject will reduce the compatibility of the corresponding hardware as well as will reduce the usable bandwidth. Here, a second thread is only executed after the first thread has finished its processing.

It is an object of the invention to provide a data processing system within a multithreaded environment which is capable of efficiently communicating with external devices.

This object is solved by a data processing system according to claim 1, a controller according to claim 4, and a method for controlling the communication between a processor and an external peripheral device according to claim 5.

Therefore, a data processing system based on a multi-threaded operating system is provided. The data processing system comprises at least one processor for processing data based on multiple threads, at least one controller unit for controlling the communication between said at least one processor and an external peripheral device connected to said at least one controller unit. Said at least one controller unit comprises at least one buffer memory for buffering data from said peripheral device connected to said at least one controller unit, and at least one memory managing unit for managing the access to said at least one buffer memory by mapping said at least one buffer memory into N banks each with a dedicated prefetch register. At least one of said multiple threads is mapped to one of said N banks and its dedicated prefetch register.

Therefore, a data processing system based on a multi-thread operating system is provided which allows an efficient switching of prefetch registers for respective threads such that a high speed access of the external peripheral device is achieved. Multiple threads can be efficiently interleaved by avoiding additional prefetch time periods. Additionally, the controller is connected to processors as a memory-mapped resource. The bandwidth is not reduced and read accesses can run at full speed even for multiple threads.

According to an aspect of the invention a thread register for storing thread identification information is provided. Based on this information the controller itself will know which thread is currently accessing the buffer memory BM and may switch between the respective prefetch registers based on this information avoiding additional prefetch periods.

The invention also relates to a controller for controlling the communication between at least one processor and an external peripheral device connected to said at least one controller in a data processing environment based on a multi-threaded operating system. The controller comprises at least one buffer memory for buffering data from said peripheral device connected to said at least one controller, and at least one memory managing unit for managing the access to said at least one buffer memory by mapping said at least one buffer memory into N banks each with a dedicated prefetch register. At least one of said multiple threads is mapped to one of said N banks and its dedicated prefetch register.

The invention further relates to a method for controlling the communication between at least one processor and an external peripheral device connected to said at least one controller unit in a data processing environment based on a multi-threaded operating system. Data is processed based on multiple threads. Data from said peripheral device connected to said at least one controller unit is buffered. The access to said at least one buffer memory is managed by mapping said at least one buffer memory into N banks each with a dedicated prefetch register. At least one of said multiple threads is mapped to one of said N banks and its dedicated prefetch register.

The invention is based on the idea to provide a connectivity to a variety of peripheral devices in a multi-thread operating system such that the peripheral devices can be efficiently accessed by multiple-threads the same way as the systems shared memory, i.e. a SRAM-like memory, is accessed. Therefore, an interface for peripheral devices comprises a buffer memory which is mapped into N banks by a memory managing unit. A dedicated prefetch register is associated to each of the N banks of the buffer memory. This additional address space for the prefetch registers are used to communicate the particular thread information to the interface such that the prefetch registers are switched in time according to the different threads accessing the interface.

These and other aspects of the invention are apparent from and will be elucidated with reference to the embodiments described hereinafter.

Figure 1:
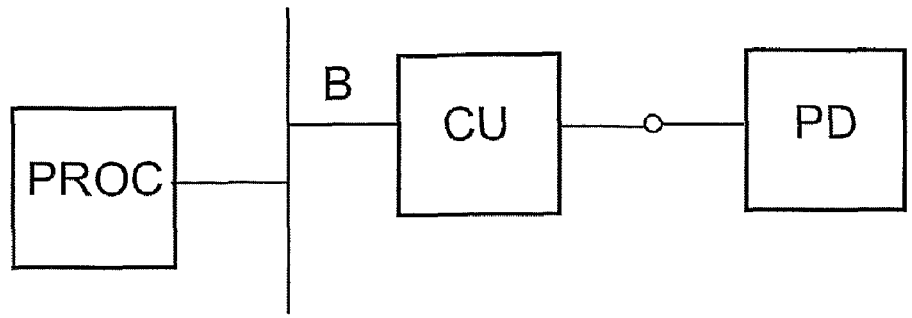
FIG. 1 shows the basic architecture of a data processing system according to a first embodiment.

FIG. 1 shows the basic architecture of a data processing system according to a first embodiment. At least one processor PROC is connected to a controller CU via a system bus B. The controller CU may be connected to at least one peripheral device PD. The controller CU serves to manage and control the communication between the processor PROC and the peripheral device PD.

Figure 2:
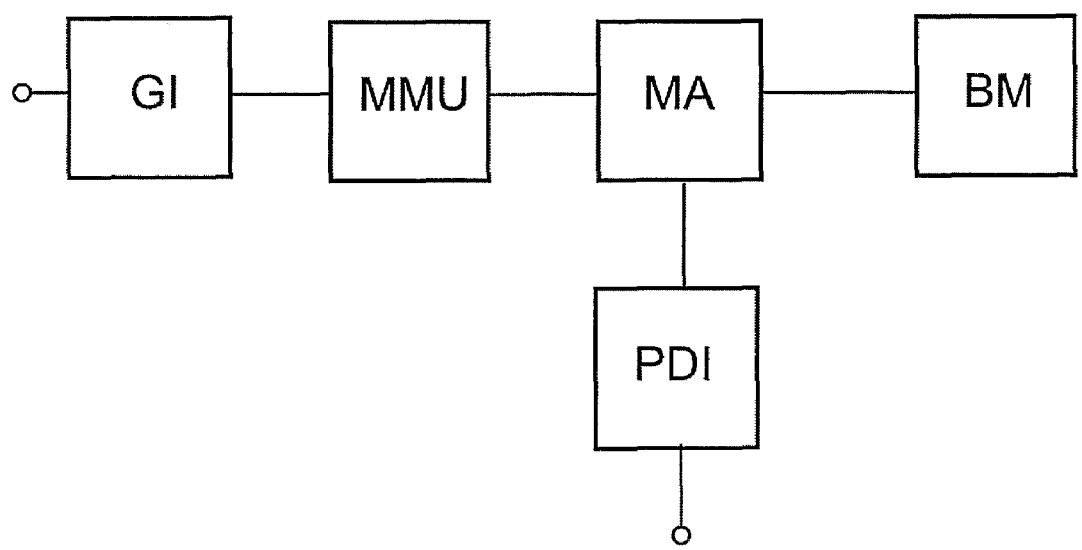
FIG. 2 shows a block diagram of the basic arrangement of the controller of FIG. 1.

FIG. 2 shows a block diagram of the basic arrangement of the controller of FIG. 1. The controller CU comprises a generic interface GI to connect the controller to a processor PROC e.g. via a system bus B. The controller further comprises a buffer memory BM, a memory managing unit MMU, a memory arbiter MA, and a peripheral device interface PDI. The controller with its generic interface GI allows that the controller is connected to different processors as a memory-mapped resource. The use of the memory managing unit MMU enables the accessibility of the internal buffer memory BM via the generic interface GI. The memory managing unit MMU further serves to implement a virtual segmentation of the buffer memory with the possibility of bank switching on requests of different tasks in a multi-tasking environment.

Figure 3:
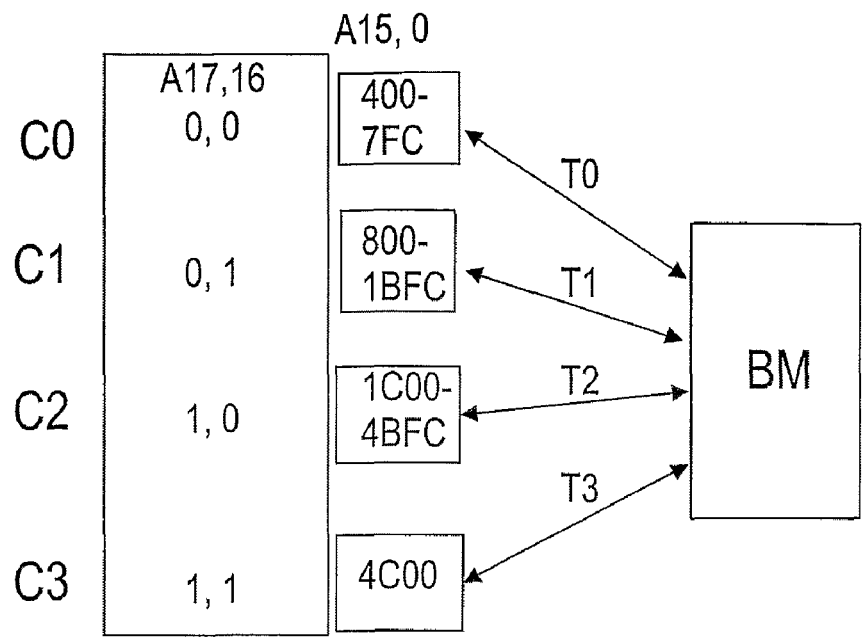
FIG. 3 shows a basic representation of the mapping of the buffer memory BM of FIG. 2.

FIG. 3 shows a basic representation of the mapping of the buffer memory BM of FIG. 2. Here, the buffer memory BM of 64K RAM is mapped or segmented into 4 banks C0, C1, C2, and C3. By mapping the buffer memory BM into 4 different banks C0-C3 the same physical memory SRAM will appear to the processor PROC as different sections. To address the 64K RAM a 16-bit address A15, 0 is necessary. According to the first embodiment each thread T0-T3 as processed on the processor PROC is associated to one of the banks C0-C3 of the buffer memory BM. If 4 threads T0-T3 are processed by the processor PROC, the 4 banks may correspond to the address ranges 400-7FC, 800-1BFC, 1C00-4BFC, and 4C00, i.e. the 4 banks C0-C3 are internally mapped to the same physical memory. The information which thread T0-T3 is associated to which bank C0-C3 can be encoded into 2 bits. Accordingly, additional address lines A17/16 (2-bits) are provided, such that the particular values of the two additional 0,0; 0,1; 1,0; 1,1 refer to the 4 banks C0-C3, respectively.

Figure 4:
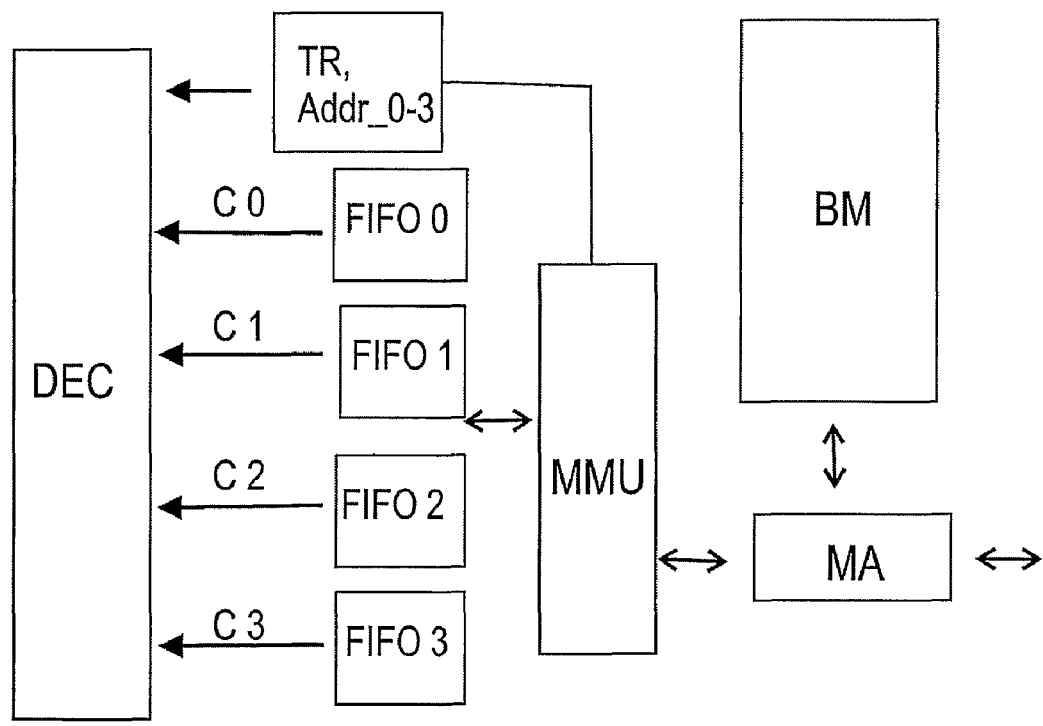
FIG. 4 shows a basic arrangement of the controller of FIG. 1 according to a second embodiment.

FIG. 4 shows a basic arrangement of the controller of FIG. 1 according to a second embodiment. The controller comprises a buffer memory BM, a memory arbiter MA, a memory managing unit MMU, a thread register TR and prefetch registers Addr_0, Addr_1, Addr_2, and Addr_3, FIFOs FIFO 0-3 and a decoder DEC. The decoder DEC is coupled to an interface to the processor PROC and the memory arbiter MA is coupled to an interface for the peripheral device. Here, only those units are explicitly shown which are required to explain the basic principles of the invention. However, the controller may also comprise other units.

The prefetch registers Addr_0, Addr_1, Addr_2, and Addr_3 and the FIFOs serve to reduce the latency of read accesses to the buffer memory BM and are provided such that each bank C0-C3 of the buffer memory BM has its dedicated prefetch register Addr_0, Addr_1, Addr_2, and Addr_3. The 2-bit address for the 4 banks as stored in the tread register TR is used to map one of the threads to one of the 4 banks C0-C3 as described according to FIG. 3. Accordingly, the 2-bit address provides a clear indication for the controller which thread T0-T3 is currently accessing the buffer memory BM. In other words, each thread accesses a different sector or bank of the buffer memory BM as indicated by the 2-bit address. The address bits 0 to 15 are used to indicate the address in the buffer memory BM and the address bits 16-17 indicate the different sector or bank of the buffer memory BM. Hence, if the address bits 16 and 17 as stored in the tread register TR are checked, the controller will know which of the threads are accessing the buffer memory without having any knowledge of the processor or the processing thereon.

In the following an example of the processing of the of multiple threads, in particular 4 threads, in the data processing system according to the first and second embodiment is described. The first to fourth threads T0-T3 use address registers Addr_0 to Addr_3, respectively. The buffer memory BM occupies 256K (start address 0x2000 0000; end address 0x2003 FFFF) in the overall memory mapped system, i.e. the shared memory. As described above this buffer memory space is divided into 4 banks, i.e. C0: 0x2000 0000 to 0x2000 FFFF (64 k), C1: 0x2001 0000 to 0x2001 FFFF (64 k), C2: 0x2002 0000 to 0x2002 FFFF (64 k), and C3: 0x2003 0000 to 0x2003 FFFF (64 k).

The processing starts with the first thread T0 accessing the buffer memory BM from the address 0x2001 0400, hence this address is written into the prefetch register Addr_0. From this address the decoder establishes that the first thread T0 accesses the first bank C0 and extracts data from the FIFO0 associated to the first bank C0. The address register Addr_0 is incremented accordingly, such that the content thereof always indicate the next location which is to be read. If e.g. an interrupt occurs when the first thread T0 is accessing the address 0x2000 0408, the processor switches to the second thread T1, which accesses the buffer memory at the address 0x2001 0800 and writes this address into the second address register Addr_1. The second thread T1 waits until the respective data is prefetched into the FIFO1. The decoder DEC establishes that the second tread T1 is accessing the second bank C1 (values of the address lines A17/16 have changed) and extracts the respective data from the FIFO1 associated to the second bank C1. The second address register is incremented accordingly. After the second thread T1 has finished its access to the buffer memory, the processor PROC switches back to the first thread T0. The switching of the threads by the processor PROC is detected as a different value is stored in the thread register TR, as the values of the address lines A17/16 have been changed. Therefore, the first address register Addr_0 is selected as prefetch register again and the first thread T0 may continue accessing the FIFO0 associated to the first bank C0 without the need to await the prefetch period as the following data has previously (i.e. before the interrupt) been prefetched.

The above mentioned controller or interface may be used in peripherals like portable digital assistants PDA, mobile phones, digital cameras, portable storage devices or the like as an interface to exchange data with a host computer. However, such peripherals may also comprise the controller or interface to communicate with each other without a host computer, wherein each peripheral comprise a respective interface. These interfaces may be IEEE 1394 controller, USB controller, modem controller or the like.

Although in the embodiments above only 4 bank and 4 threads have been described, it should be noted that also any other numbers of threads are possible. However, 4 banks are preferable for an USB interface. By allowing two or more threads to share a bank and its corresponding thread register, a graceful degradation is allowed in the case that the processor handles more threads than banks are available.

The only disadvantage of the above idea is that more address space is required than for the actual physical memory.

It is remarked that the scope of protection of the invention is not restricted to the embodiments described herein. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. Data processing system based on a multi-threaded operating system, comprising:
    at least one processor for processing data based on multiple threads
    at least one controller unit for controlling the communication between said at least one processor and an external peripheral device connected to said at least one controller unit
    said at least one controller unit comprises at least one buffer memory for buffering data from said peripheral device connected to said at least one controller unit and at least one memory managing unit for managing the access to said at least one buffer memory by mapping said at least one buffer memory into N banks, each said bank having an associated dedicated pre-fetch register and wherein each of said multiple threads is mapped to one of said N banks and the dedicated pre-fetch, register, wherein the dedicated pre-fetch register stores a pre-fetch address of the thread when the dedicated pre-fetch register is mapped to that said thread for running.

2. Data processing system according to claim 1, further comprising:
    a thread register for storing thread identification information.

3. Data processing system according to claim 2, wherein the thread identification information is encoded in additional address lines.

4. Controller unit for controlling the communication between at least one processor and an external peripheral device connected to said at least one controller unit in a data processing environment based on a multi-threaded operating system, comprising:
    at least one buffer memory for buffering data from said peripheral device connected to said at least one controller, and
    at least one memory managing unit for managing the access to said at least one buffer memory by mapping said at least one buffer memory into N banks, each said bank having an associated dedicated pre-fetch register, and wherein each of said multiple threads is mapped to one of said N banks and the dedicated pre-fetch register, wherein the dedicated pre-fetch register stores a pre-fetch address of the thread when the dedicated pre-fetch register is mapped to that said thread for running.

5. Method for controlling the communication between at least one processor and an external peripheral device connected to said at least one controller unit in a data processing environment based on a multi-threaded operating system, comprising the steps of:
    processing data based on multiple threads
    buffering data from said peripheral device connected to said at least one controller unit and
    managing the access to said at least one buffer memory by mapping said at least one buffer memory into N banks, each said bank having an associated dedicated pre-fetch register, and wherein each of said multiple threads is mapped to one of said N banks and the dedicated pre-fetch register, wherein the dedicated pre-fetch register stores a pre-fetch address of the thread when the dedicated pre-fetch register is mapped to that said thread for running.

* * * * *